US006681001B1

United States Patent
Clayton et al.

(10) Patent No.: US 6,681,001 B1
(45) Date of Patent: *Jan. 20, 2004

(54) COMPUTER INTEGRATED TELECOMMUNICATIONS SYSTEMS AND METHODS

(75) Inventors: John B. Clayton, Northboro, MA (US); Michael J. Newman, Brookline, MA (US); Steven M. Staudaher, Sterling, MA (US)

(73) Assignee: Nortel Networks Limited (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/131,521

(22) Filed: Aug. 10, 1998

Related U.S. Application Data

(63) Continuation of application No. 08/601,123, filed on Feb. 14, 1996, now Pat. No. 5,875,234.

(51) Int. Cl.[7] ................................................ H04M 3/42

(52) U.S. Cl. ...................... 379/93.05; 379/166; 379/229

(58) Field of Search ............................. 379/67.1, 93.05, 379/93.06, 93.07, 165, 166, 225, 229, 233, 242, 284, 399.01, 399.02; 710/100, 101; 370/359, 908

(56) References Cited

U.S. PATENT DOCUMENTS

| | | | |
|---|---|---|---|
| 4,009,337 A | 2/1977 | Sakai et al. ............. 179/18 ES |
| 4,105,871 A | 8/1978 | Ely et al. ..................... 179/18 |
| 4,228,536 A | 10/1980 | Gueldenpfennig et al. .... 370/66 |
| 4,289,934 A | 9/1981 | Pitroda et al. ............ 179/27 D |
| 4,484,031 A | 11/1984 | Gray et al. ............. 179/18 BE |
| 4,521,879 A | 6/1985 | Gueldenpfennig et al. .... 370/62 |
| 4,527,012 A | 7/1985 | Caplan et al. ................ 179/18 |
| 4,575,584 A | 3/1986 | Smith et al. .............. 179/81 R |
| 4,612,634 A | 9/1986 | Bellamy ..................... 370/58 |
| 4,615,028 A | 9/1986 | Lewis et al. ................. 370/58 |
| 4,674,082 A | 6/1987 | Flanagin et al. ............. 370/60 |

(List continued on next page.)

FOREIGN PATENT DOCUMENTS

| | | |
|---|---|---|
| EP | 0 192 394 | 9/1986 |
| EP | 0 561 026 | 9/1993 |
| JP | 58-69193 | 4/1983 |

OTHER PUBLICATIONS

American National Standard for Extensions to ANSI/VITA 6–1994 Signal Computing System Architecture, Approved by the America National Standards Institute, Inc., Feb. 20, 1998; VMEbus International Trade Association, Scottsdale, AZ, ISBN#1–885731–11–6 (1998).

American National Standard for Signal Computing System Architecture (SCSA), Approved by the American National Standards Institute, Inc., Jul. 24, 1995; VMEbus International Trade Association, Scottsdale, AZ, ISBN#1–885731–11–6 (1995).

American Tel–A–Systems, Inc. XDS Switch Matrix Board. Technical Manual (1995).

(List continued on next page.)

*Primary Examiner*—Scott L. Weaver
(74) *Attorney, Agent, or Firm*—Steubing McGuinness & Manaras LLP

(57) ABSTRACT

Computer integrated telecommunication systems are disclosed that provide a message exchange interface that transfers data and control requests generated by applications running on a computer system directly to a telecommunications unit that is adapted to respond to the data and control requests generated by these application programs. In particular, PBX systems are disclosed that include message exchange interfaces that provide fault tolerant operation and that directly map application programs running on a computer system into the controller element of the PBX system. Further systems are disclosed that provide message exchange interfaces that allow the efficient transfer of audio signals between a computer system and a telecommunication unit.

21 Claims, 5 Drawing Sheets

U.S. PATENT DOCUMENTS

| | | |
|---|---|---|
| 4,694,452 A | 9/1987 | Beckinger et al. ............. 370/58 |
| 4,696,028 A | 9/1987 | Morganstein et al. ......... 379/88 |
| 4,736,365 A | 4/1988 | Stern ............................ 370/85 |
| 4,736,406 A | 4/1988 | Molnar ......................... 379/94 |
| 4,736,409 A | 4/1988 | Hasegawa et al. ........... 379/269 |
| 4,740,955 A | 4/1988 | Litterer et al. ................ 370/67 |
| 4,744,103 A | 5/1988 | Dahlquist et al. ............ 379/247 |
| 4,757,497 A | 7/1988 | Beierle et al. ................. 370/89 |
| 4,760,516 A | 7/1988 | Zwick ......................... 364/200 |
| 4,817,089 A | 3/1989 | Paneth et al. ................. 370/95 |
| 4,852,149 A | 7/1989 | Zwick et al. ................. 379/67 |
| 4,866,758 A | 9/1989 | Heinzelmann ............... 379/94 |
| 4,878,240 A | 10/1989 | Lin et al. ...................... 379/67 |
| 4,893,335 A | 1/1990 | Fuller et al. .................. 379/200 |
| 4,903,258 A | 2/1990 | Kuhlmann et al. .......... 370/58.2 |
| 4,903,263 A | 2/1990 | Patel et al. ............... 370/110.1 |
| 4,908,850 A | 3/1990 | Masson ........................ 379/88 |
| 4,916,726 A | 4/1990 | Morley, Jr. et al. ........... 379/88 |
| 4,935,954 A | 6/1990 | Thompson et al. ........... 379/89 |
| 4,939,771 A | 7/1990 | Brown et al. ................. 379/67 |
| 4,951,310 A | 8/1990 | Honda et al. ................. 379/266 |
| 4,955,054 A | 9/1990 | Boyd, Jr. et al. ............ 379/269 |
| 4,972,452 A | 11/1990 | Chack et al. .................. 379/2 |
| 4,993,014 A | 2/1991 | Gordon ........................ 370/16 |
| 4,993,017 A | 2/1991 | Bachinger et al. .......... 370/58.2 |
| 5,001,710 A | 3/1991 | Gawrys et al. ........... 370/110.1 |
| 5,007,080 A | 4/1991 | MacMillan et al. ......... 379/269 |
| 5,014,269 A | 5/1991 | Picandet .................. 370/85.11 |
| 5,022,024 A | 6/1991 | Paneth et al. ................. 370/50 |
| 5,027,384 A | 6/1991 | Morganstein ............... 379/67 |
| 5,040,208 A | 8/1991 | Jolissaint .................... 379/209 |
| 5,046,088 A | 9/1991 | Margulies ................... 379/211 |
| 5,073,923 A | 12/1991 | Offers et al. ................. 379/165 |
| 5,097,528 A | 3/1992 | Gursahaney et al. .......... 379/67 |
| 5,109,405 A | 4/1992 | Morganstein ............... 379/89 |
| 5,113,429 A | 5/1992 | Morley, Jr. et al. ........... 379/88 |
| 5,121,391 A | 6/1992 | Paneth et al. ............... 370/95.1 |
| 5,125,023 A | 6/1992 | Morduch et al. ............. 379/88 |
| 5,150,357 A | 9/1992 | Hopner et al. ............. 370/68.1 |
| 5,159,594 A | 10/1992 | Bales et al. ............... 370/110.1 |
| 5,185,781 A | 2/1993 | Dowden et al. .............. 379/67 |
| 5,193,110 A | 3/1993 | Jones et al. ................... 379/94 |
| 5,195,085 A | 3/1993 | Bertsch et al. ............... 370/13 |
| 5,212,688 A | 5/1993 | Gerbehy et al. ......... 370/105.1 |
| 5,214,688 A | 5/1993 | Szlam et al. .................. 379/67 |
| 5,214,692 A | 5/1993 | Chack et al. ................ 379/265 |
| 5,216,704 A | 6/1993 | Williams et al. .............. 379/93 |
| 5,218,636 A | 6/1993 | Hamilton .................... 376/386 |
| 5,222,120 A | 6/1993 | McLeod ....................... 379/88 |
| 5,268,958 A | 12/1993 | Nakano ....................... 379/211 |
| 5,274,696 A | 12/1993 | Perelman .................... 379/89 |
| 5,283,827 A | 2/1994 | Conforti et al. ............. 379/399 |
| 5,291,492 A | 3/1994 | Andrews et al. ......... 370/110.1 |
| 5,291,549 A | 3/1994 | Izumi .......................... 379/233 |
| 5,299,198 A | 3/1994 | Kay et al. .................. 370/95.3 |
| 5,303,298 A | 4/1994 | Morganstein et al. ......... 379/67 |
| 5,311,576 A | 5/1994 | Brunson et al. .............. 379/89 |
| 5,315,647 A | 5/1994 | Araujo ........................ 379/265 |
| 5,319,703 A | 6/1994 | Drory ......................... 379/351 |
| 5,321,744 A | 6/1994 | Madonna et al. ........... 379/269 |
| 5,327,489 A | 7/1994 | Anderson et al. ........... 379/207 |
| 5,333,189 A | 7/1994 | Clary et al. ................. 379/242 |
| 5,333,266 A | 7/1994 | Boaz et al. .................. 395/200 |
| 5,341,374 A | 8/1994 | Lewen et al. ................ 370/450 |
| 5,347,564 A | 9/1994 | Davis et al. .................. 379/12 |
| 5,349,579 A | 9/1994 | Madonna et al. ........... 370/58.2 |
| 5,349,636 A | 9/1994 | Irribarren .................... 379/89 |
| 5,349,640 A | 9/1994 | Dunn et al. ................. 379/387 |
| 5,351,276 A | 9/1994 | Doll, Jr. et al. .............. 379/67 |
| 5,353,331 A | 10/1994 | Emery et al. ................. 379/58 |
| 5,355,406 A | 10/1994 | Chencinski et al. .......... 379/88 |
| 5,375,161 A | 12/1994 | Fuller et al. .................. 379/57 |
| 5,381,466 A | 1/1995 | Shibayama et al. ........... 379/88 |
| 5,392,334 A | 2/1995 | O'Mahony ................... 379/67 |
| 5,406,557 A | 4/1995 | Baudoin ...................... 370/61 |
| 5,412,660 A | 5/1995 | Chen et al. ............... 370/110.1 |
| 5,414,762 A | 5/1995 | Flisik et al. ................. 379/198 |
| 5,420,852 A | 5/1995 | Anderson et al. ............. 370/58 |
| 5,422,941 A | 6/1995 | Hasenauer et al. ......... 379/207 |
| 5,426,694 A | 6/1995 | Hebert ....................... 379/242 |
| 5,428,679 A | 6/1995 | French ....................... 379/201 |
| 5,444,707 A | 8/1995 | Cerna et al. ............... 370/94.1 |
| 5,452,289 A | 9/1995 | Sharma et al. ............. 370/32.1 |
| 5,463,616 A | 10/1995 | Kruse et al. ................... 370/24 |
| 5,471,470 A | 11/1995 | Sharma et al. ................ 370/81 |
| 5,473,669 A | 12/1995 | Kanada et al. .............. 379/59 |
| 5,475,738 A | 12/1995 | Penzias ........................ 379/67 |
| 5,477,529 A | 12/1995 | Gingell ........................ 370/13 |
| 5,497,373 A | 3/1996 | Hulen et al. ................. 370/79 |
| 5,506,897 A | 4/1996 | Moore et al. ............... 379/220 |
| 5,517,556 A | 5/1996 | Pounds et al. ................ 379/67 |
| 5,517,562 A | 5/1996 | McConnell ................ 379/207 |
| 5,524,110 A | 6/1996 | Danneels et al. ............. 370/62 |
| 5,524,146 A | 6/1996 | Morrisey et al. ........... 379/207 |
| 5,526,353 A | 6/1996 | Henley et al. ............. 370/60.1 |
| 5,530,740 A | 6/1996 | Irribarren et al. ............. 379/89 |
| 5,533,102 A | 7/1996 | Robinson et al. ............. 379/67 |
| 5,537,461 A | 7/1996 | Bridges et al. ............... 379/88 |
| 5,544,163 A | 8/1996 | Madonna ................... 370/60.1 |
| 5,550,913 A | 8/1996 | McMaster et al. .......... 379/230 |
| 5,557,668 A | 9/1996 | Brady ......................... 379/212 |
| 5,566,235 A | 10/1996 | Hetz ........................... 379/201 |
| 5,568,544 A | 10/1996 | Keeler et al. ............... 379/273 |
| 5,572,577 A | 11/1996 | Harrila ......................... 379/67 |
| 5,574,888 A | 11/1996 | Panditji et al. .............. 395/500 |
| 5,577,041 A | 11/1996 | Sharma et al. ................ 370/79 |
| 5,581,600 A | 12/1996 | Watts et al. ................... 379/67 |
| 5,598,409 A | 1/1997 | Madonna et al. ........... 370/364 |
| 5,602,991 A | 2/1997 | Berteau .................... 395/200.01 |
| 5,604,740 A | 2/1997 | Pinault et al. ............... 370/463 |
| 5,610,972 A | 3/1997 | Emery et al. ................. 379/58 |
| 5,617,422 A | 4/1997 | Litzenberger et al. ....... 370/401 |
| 5,619,508 A | 4/1997 | Davis et al. ................. 370/495 |
| 5,621,727 A | 4/1997 | Vaudreuil ..................... 370/60 |
| 5,623,539 A | 4/1997 | Bassenyemukasa et al. .. 379/88 |
| 5,625,675 A | 4/1997 | Katsumaru et al. ........... 379/67 |
| 5,625,678 A | 4/1997 | Blomfield-Brown ......... 379/93 |
| 5,625,682 A | 4/1997 | Gray et al. .................. 379/266 |
| 5,631,954 A | 5/1997 | Evans et al. ................ 379/201 |
| 5,646,981 A | 7/1997 | Klein ............................ 379/67 |
| 5,646,982 A | 7/1997 | Hogan et al. ................. 379/89 |
| 5,647,002 A | 7/1997 | Brunson ....................... 380/49 |
| 5,649,005 A | 7/1997 | Lynch et al. ................ 379/242 |
| 5,652,866 A | 7/1997 | Aldred et al. ............... 395/500 |
| 5,657,358 A | 8/1997 | Panech et al. ............... 375/356 |
| 5,657,376 A | 8/1997 | Espeut ......................... 379/89 |
| 5,657,446 A | 8/1997 | Pinard et al. ............. 379/90.01 |
| 5,664,010 A | 9/1997 | Walker et al. .............. 379/207 |
| 5,673,261 A | 9/1997 | Tjabben et al. ............. 376/384 |
| 5,674,003 A | 10/1997 | Andersen et al. ........... 364/514 |
| 5,687,194 A | 11/1997 | Paneth et al. ............... 375/283 |
| 5,689,550 A | 11/1997 | Garson et al. ................ 379/89 |
| 5,719,919 A | 2/1998 | Grecco et al. ............... 306/197 |
| 5,719,920 A | 2/1998 | Harman ....................... 379/88 |
| 5,722,076 A | 2/1998 | Sakabe et al. .............. 455/450 |
| 5,724,407 A | 3/1998 | Bruno et al. .................. 379/67 |
| 5,732,130 A | 3/1998 | Iapalucci et al. ............ 379/207 |
| 5,734,828 A | 3/1998 | Pendse et al. .......... 395/200.23 |
| 5,737,320 A | 4/1998 | Madonna .................... 370/258 |
| 5,737,395 A | 4/1998 | Irribarren .................... 379/88 |
| 5,740,231 A | 4/1998 | Cohn et al. .................. 379/89 |

| | | |
|---|---|---|
| 5,751,791 A | 5/1998 | Chen et al. .................... 379/88 |
| 5,757,898 A | 5/1998 | Nishikawa .................. 379/165 |
| 5,761,201 A | 6/1998 | Vaudreuil ................... 370/392 |
| 5,761,288 A | 6/1998 | Pinard et al. ................ 379/201 |
| 5,771,279 A | 6/1998 | Cheston, III et al. ..... 379/93.17 |
| 5,778,053 A | 7/1998 | Skarbo et al. ........... 379/93.21 |
| 5,787,156 A | 7/1998 | Katz ....................... 379/93.13 |
| 5,799,067 A | 8/1998 | Kikinis et al. ........... 379/93.06 |
| 5,799,068 A | 8/1998 | Kikinis et al. ........... 379/98.06 |
| 5,799,076 A | 8/1998 | Sitters et al. ............... 379/229 |
| 5,812,639 A | 9/1998 | Bartholomew et al. ....... 379/89 |
| 5,848,131 A | 12/1998 | Shaffer et al. ................ 379/88 |
| 5,864,551 A | 1/1999 | Madonna .................... 370/353 |
| 5,872,779 A | 2/1999 | Vaudreuil ................... 370/352 |
| 5,912,947 A | 6/1999 | Langsenkamp et al. ....... 379/69 |

OTHER PUBLICATIONS

American Tel–A–Systems, Inc. SCSA PEB Conference Board. Technical Manual (1995).

Computer Telephony vol. 1(1), pp. 4–10,12,14,18–19,22, 24–26,29–30,32,40,80,90–91,98,101,103–104,118–120, 126–130 (Fall 1993).

Computer Telephony vol. 1(2), pp. 4–5,9–10,12,15–16,19–20,22,24,26–28,48–55,58,75–77,83, 85–86,87 (Jan./Feb. 1994).

Computer Telephony vol. 1(3), pp. 4–6,11–14,16,20,23–26, 44,47–55,66,80,84–87,91,95,97 (Mar./Apr. 1994).

*Computer Telephony* vol. 1(4), pp. 4–7,20,26,48–57,60–61, 63–64,66–69,72–82 (May/Jun. 1994).

*Computer Telephony* vol. 1(5), pp. 4–5,14,16–18,20,22,24, 26,28,31 (Jul./Aug. 1994).

*Computer Telephony* vol. 1(5), pp. 4–5,12,16,19–21,23–24, 26–33,47–48,51–52,63,71,101 (Sep./Oct. 1994).

*Computer Telephony* vol. 1(6), pp. 4–5,24,30,35,46,76–79 (Nov./Dec. 1994).

*Computer Telephony* vol. 2(1), pp. 4–5,48–49,64 (Jan. 1995).

*Computer Telephony* vol. 2(2), pp. 4–5,12,42,47 (Feb. 1995).

Dialogic Corporation "Customizing D/41 Call Analysis" Application Note AN002 (Feb. 1989).

Dialogic Corporation "Why Is T–1 Important And How Can It Be Used" Application Note AN003 (Sep. 1988).

Dialogic Corporation "Use of Dialogic T–1 In Telephone Company Networks" Application Note AN006 (1988).

Dialogic Corporation "Use Of Dialogic T–1 Equipment In CPE Gateways" Application Note (Oct. 1988).

Dialogic Corporation "Use Of Dialogic® Components in Automatic Number Identification (ANI) Systems" Application Note AN015 (1990–1991).

Dialogic Corporation "Use Of Dialogic® UNIX® Voice Driver for High Channel Density and High Performance Call Processing" Application Note AN016 (1990).

Dialogic Corporation "Ordering Service and Installing Equipment for T–1 Applications" Application Note AN017 (1991).

Dialogic Corporation "Collecting Caller ID with the D/42–NS" Technical Note #008 (1994).

Dialogic Corporation, AMX80 Audio Multiplexer Users Guide, Preliminary Version 1.7 (Feb. 5, 1987).

Dialogic Corporation, D/41E Hardware Diagnostic Guide (D41ECHK) (Oct. 18, 1993).

Dialogic Corporation, Dialog/40A.41 Multi–Line Voice Communications System Users Guide, Version 2.2 (May 1, 1987).

Dialogic Corp: Dialogic Personal Voice Messenger™ Augio Services Window (Brochure). (Sep. 1985).

Dialogic Corporation, Hardware Supplement: D/41D–IT (Apr. 23, 1993).

Dialogic Corporation, Hardware Supplement: D/41E–UK, D21E–UK (Apr. 20, 1994).

Dialogic Corporation, DIALOG/4x: Multi–Line Voice Communication. System User's Guide, Version 2.30 (1988).

Dialogic Corporation, Voice Hardware Diagnostic Guide (D40CHK) (Sep. 1, 1993).

Dialogic Corporation, Voice Hardware Installation Guide (Apr. 20, 1994).

Edgar, Bob PC–Based Voice Processing. How to Design, Build and Program Systems Using Industry–Standard Dialogic Hardware (1992).

Excel, Inc., PCX–384 Excel Digital Exchange T1 Switching System User's Manual (Aug. 1990).

Excel, Inc., PCX–384 PC Digital Switching Exchange (Product Literature, Undated).

Horowitz, Paul et al., *The Art of Electronics*, $2^{nd}$ ed., Cambridge University Press, Cambridge, UK, ISBN1πO–521–37095–7 pp. 818–820 (Jul. 1989).

Kubo, Teruyuki, et al. "Flexible Network Access Structure Applicable to Versatile Terminal Distribution Patterns" IEE Conference Publication; No. 288, pp. 75–80 (1988).

Li, San–Qi et al. "ILAN–ISDN Gateway" Conference Record—International Conference on Communications, IEEE, New York, NY, USA, pp. 101–106 (1988).

Margulies, Edwin Client Server Computer Technology: the Definitive Roadmap to the Client–Server Revolution, Flatiron Publishing, Inc., New York, NY, ISBN #0–936648–55–4 (Jul. 1994).

Mortensen, Randy "DPBX–LAN Internetworking" WESCANEX 88: Digital Communications Conference Proceedings. Saskatoon, Saskatchewan, CA, May 5, 1988; IEEE, New York, NY, pp. 6–9 (1988).

Robertson, David et al. "A Highly Flexible Small Digital Telephone System" IEEE International Conference on Communications; Atlanta, GA, Apr. 15–19, 1990; vol. 1, pp. 211.3.1–211.3.6 (1990).

Schmandt, Chris et al. "Phonetool: Integrating Telephones and Workstations" IEEE Global Telecommunications Conference and Exhibition; IEEE, IEEE Service Center, Piscataway, NJ, USA; vol. 2: pp. 970–974 (1989).

Stagg, L.J. "Integrating the Computer and Telecommunications" IEE Conference Publication, IEE, Michael Faraday House, Stevenage, Engl.; No. 357, pp. 191–198 (1992).

Stok Software Inc., VBAS/40 Voice Prompt Editor/Generator with File Transfer (FTRAN) Utilities for the DIALOG/40 (Manual). (Sep. 1986).

"Travels: Voice Messaging and T–1 Networking Explode As We Visit TCA, ATMS and Pc Expo; the First PBX in a PC Quietly Appears" *Teleconnect* 5(11): pp. 39–40 (Nov. 1987).

Udell, Jon "Computer Telephony" *Byte* p. 80–96 (Jul. 1994).

Werling, David R. et al. "Enhanced Information Services Track: 'Improving the User Interface to Enganced Services.'" Voice'92 Fall Conference & Exposition, Georgia World Congress Center, Atlanta, GA (1992).

| MESSAGE OFFSET | MESSAGE LENGTH |
|---|---|
| PRIVATE OFFSET | PRIVATE LENGTH |
| INVOKE ID | MONITOR CROSS REF ID |
| SESSION ID | MESSAGE CLASS |
| MESSAGE TYPE | CLASS-OF-SERVICE |
| CALLING DEVICE | CALLED DEVICE |

COMPUTER INTEGRATED TELECOMMUNICATIONS SYSTEMS AND METHODS

This application is a continuation of parent application Ser. No. 08/601,123 filed on Feb. 14, 1996, now U.S. Pat. No. 5,875,234.

FIELD OF THE INVENTION

The present invention relates to systems and methods for computer integrated telephony and, more particularly, to systems and methods for integrating private branch exchange (hereinafter "PBX") systems with local area network (hereinafter "LAN") servers.

BACKGROUND OF THE INVENTION

The integration of telecommunication equipment with data processing equipment provides for powerful tools that coordinate the advanced features of digital telephony with the computer processing power of digital computer networks. For example, computer integrated telephony (CIT) systems exist that integrate PBX systems with LAN systems. These PBX CIT systems provide advanced call control and processing. For example, these CIT systems can run applications that detect incoming telephone calls, employ a caller ID function to determine the identified source of the incoming call, pass the source identification information to a computer database application program that employs the source identification as an entry point to the database. From the database, the CIT system can collect relevant customer records such as the invoice statements. The CIT system at that time can transfer both the incoming call and the associated data records to a customer service agent that is most suited for handling this incoming call. For example, if the invoice records show that the account associated with the call is overdue, the CIT system transfers both the incoming call and the relevant invoice data record to an available customer service agent in the billing department of the company.

The CIT systems that exist today include a PBX system that connects to a network server. The PBX system performs the telecommunication functions which include establishing circuit connections between calls from the public telephone system and the individual extension lines within an office. The server performs the data processing applications which can include maintaining databases and running client/server applications. The interface between the PBX and the server establishes a physical and logical connection between the server and the PBX that allows for the operation of CIT systems.

The physical connection between the PBX and the server is typically a conventional computer interface that includes an interface card located in the PBX, an interface card located in the server and a cable connection that extends between these two interface cards. The interface cards typically implement a conventional data communications protocol such as X.25 or ISDN. Through this channel, the PBX and the server can exchange data for coordinating the activities of these two systems during operation of CIT system applications.

The logical connection between the PBX and the server determines how messages are exchanged across the physical interface. Typically, a client/server application running on the computer network generates either requests for actions or requests for instructions for the PBX system. The client passes these requests on to the server. The server has a translator program that translates the message requests from the application program into commands that can be used to operate the PBX. These commands are sent to a software driver that puts the commands into a format suitable for transmission over the data channel, such as the ISDN line or X.25 line. The PBX system receives through its interface card the commands and performs the functions as dictated. The PBX then transmits status messages back to the server system which translates the PBX messages into a format that the application program can understand and the server sends the translated messages to the application program. The application program determines from the translated messages what data records the application program needs to access and proceeds to route the data records to the appropriate client computer and to send further instructions to the PBX system to route any associated incoming calls to the telephone associated with that client's computer.

Although the above systems work to integrate data processing equipment with telecommunications equipment, the integration through the physical and logical connections is often perplexing and difficult to create and maintain. Firstly, most PBX architectures are proprietary, therefore the physical connection between the server and the PBX differs depending on the vendor. For example, an EtherNet port, such as the one found on the NEAX 2000 from Nec America, will be different from the ISDN BRI link employed by AT&T's Definity system. Computer network managers that have to integrate the PBX system into the local area network often find the link between the server and PBX to be both cumbersome and unreliable.

Moreover, these present systems are dependent upon the proper operation of the network LAN server. In the event that the LAN server crashes, the CIT system application that operates the PBX system is brought down. Similarly, any time the computer network manager wishes to reinitialize the network server, those CIT applications that operate the telecommunication systems will also be brought down. Accordingly, the present systems are subject to failure and are difficult to maintain. A further difficulty exists, in that the development of CIT applications is made difficult by the proprietary PBX driver that translates messages from client/server applications into commands suitable for implementation by the PBX system. In particular, as each PBX driver is typically a proprietary software system, the development of standard applications is difficult, if not impossible.

Accordingly, it is an object of the present invention to provide CIT systems that provide an improved interface between telecommunication equipment and data processing systems.

It is a particular object of the present invention to provide a PBX system that more easily integrates with the server of a local area network.

It is a further object of the present invention to provide a LAN-integrated PBX system that has improved fault tolerance.

It is an additional object of the present invention to provide a CIT system that has greater performance and improved reliability.

These and other objects of the present invention shall be made more clear by the following description that references figures having reference numbers wherein like reference numbers refer to the same elements.

SUMMARY OF THE INVENTION

Computer integrated telecommunication systems are disclosed that provide an interface that transfers data and control requests generated by applications running on a computer system directly, and unchanged, to a telecommunications unit that is adapted to respond to the data and control requests generated by these application programs. In particular, PBX systems are disclosed that include calling interfaces that directly map telephony enabled application programs into the controller element of a PBX system. Further systems are disclosed that provide interfaces that allow the efficient transfer of audio signals between a computer system and a telecommunication unit and between a computer system of a first network and a computer system of a second network.

In one aspect, the invention is understood as systems that are adapted for being integrated into the server of a computer network. The systems include a carrier interface for coupling to a plurality of carrier lines suitable for transmitting signals to a telephone. The carrier interface can include a trunk interface for coupling to one or more trunk lines, or a subscriber loop interface for coupling to a plurality of extension lines wherein each extension line is of the type which is suitable for carrying signals to a telephone. In a preferred embodiment the carrier interface includes both a trunk interface and a subscriber loop interface. The system can further include a server interface having a bus port adapted for connecting to a bus slot of the server to form a data path with the server, a controller element that transfers message signals across the data path and that generates control signals responsive to the message signals, and a switch element that is connected into an electrical circuit with the controller elements and that establishes, in response to the control signals, circuits between the plural extension lines and the trunk lines. In this way, the system according to the invention includes an interface that directly maps telephony enabled application programs into the control program of a telecommunication system. This allows the telephony enabled application to have direct access and control over the integrated telecommunications equipment.

In a preferred embodiment of the invention, the controller element includes a processor element and a memory element that includes a calling interface element, typically a software program, that operates the processor element to generate the control signals in response to the message signals which are transferred unchanged across the data path to the server. The calling interface typically includes a switch element that responds to a message-type signal included in the message signal, and responsive to the message-type signal instructs the processor to generate the control signals. In a further preferred embodiment of the invention the calling interface element operates the controller element in response to message signals which are Computer Supported Telephony Application (CSTA) compliant message signals. The calling interface can further include an element for generating message signals for transfer to the server interface. Preferably the element for generating the message signals includes an element for generating CSTA compliant message signals.

In one embodiment of the invention, the calling interface element is a software program element that is preferably stored in read only memory element which is onboard a circuit card assembly that comprises a telecommunication system. In a further embodiment of the invention, the controller element also includes a memory element for storing a call control program element that implements the telecommunication functions of the system. Preferably the controller includes an onboard power supply element for supplying power to the controller element and the memory elements to thereby provide onboard call control independent of the functioning of the integrated computer system. Accordingly, telecommunication functions such as conference calling, call transfers, and call holding can be accomplished without support from the integrated computer equipment. This provides a system having improved fault tolerant operation.

The system further can include an exchange interface that couples to a second system according to the invention for exchanging message signals between plural, ones of these systems. Preferably the exchange interface comprises an Signal Computing System Architecture (SCSA) interface to allow the daisy chain interface of plural systems. In a further embodiment of the invention the system also includes an audio data transfer element that allows the transfer of data representative of audio signals to the integrated computer element, such as the file server.

In a further aspect, the invention can be understood as network server systems that include a message bus for carrying message signals, a server controller element for controlling the transfer of message signals across the message bus, a branch exchange element that includes a bus port connected to the message bus of the server to form a data path therewith, a trunk interface for coupling to a trunk line, a subscriber loop interface for coupling to a plurality of extension lines of the type suitable for carrying signals to a telephone, a controller element in electrical circuit with said bus port for transferring the message signals across the data path and for. generating control signals responsive to the message signals and a switch element that is an electrical circuit that is in electrical circuit with the controller element for establishing, in response to the control signals generated by the control element, circuits between the plural extension lines and the trunk line.

Network server systems according to the invention can also include control elements that have audio data transfer elements for transferring data representative of voice signals to the server controller element. The server controller element can also include a play audio element that has a data memory means for storing audio files of audio information and an audio file transfer element for transferring audio files to the branch exchange element. Moreover, the network server system can also include an internetwork interface element that allows for the transfer of audio files to a second network system.

In a further aspect, the invention can be understood as a telecommunication system that is adapted for. being integrated into a stand alone computer. The system includes a trunk interface for coupling to a trunk line, a subscriber loop interface for coupling to a plurality of extension lines of the type suitable for carrying signals to a telephone, a computer interface having a bus port adapted for connecting to a bus slot of the computer to form a data path with that computer, a controller element in electrical circuit with the bus port for transferring message signals across the data path and for generating control signals in response to the message signals and a switch element that establishes, in response to the control signals generated by the controller element, circuits between the plural extension lines and trunk lines.

BRIEF DESCRIPTION OF THE FIGURES

FIG. 4 depicts the data structure of one message unit data structure employed by the software depicted in FIG. 3.

DETAILED DESCRIPTION OF THE ILLUSTRATED EMBODIMENTS

The following describes certain exemplary embodiments of the invention disclosed herein that provides computer systems that include highly integrated telecommunication equipment. The highly integrated systems according to the invention provide a message exchange interface that transfers data and control requests generated by applications running on a networked computer system directly to a telecommunications unit that is adapted to respond directly to the data and control requests generated by these application programs. Such high integration achieves mapping of application programs directly into the controller element of the telecommunication equipment that is integrated into the server system. Other advantages of applicants' invention are set forth herein with still more advantages being obvious to one of ordinary skill in the art of telecommunications and computer engineering.

Figure 1:
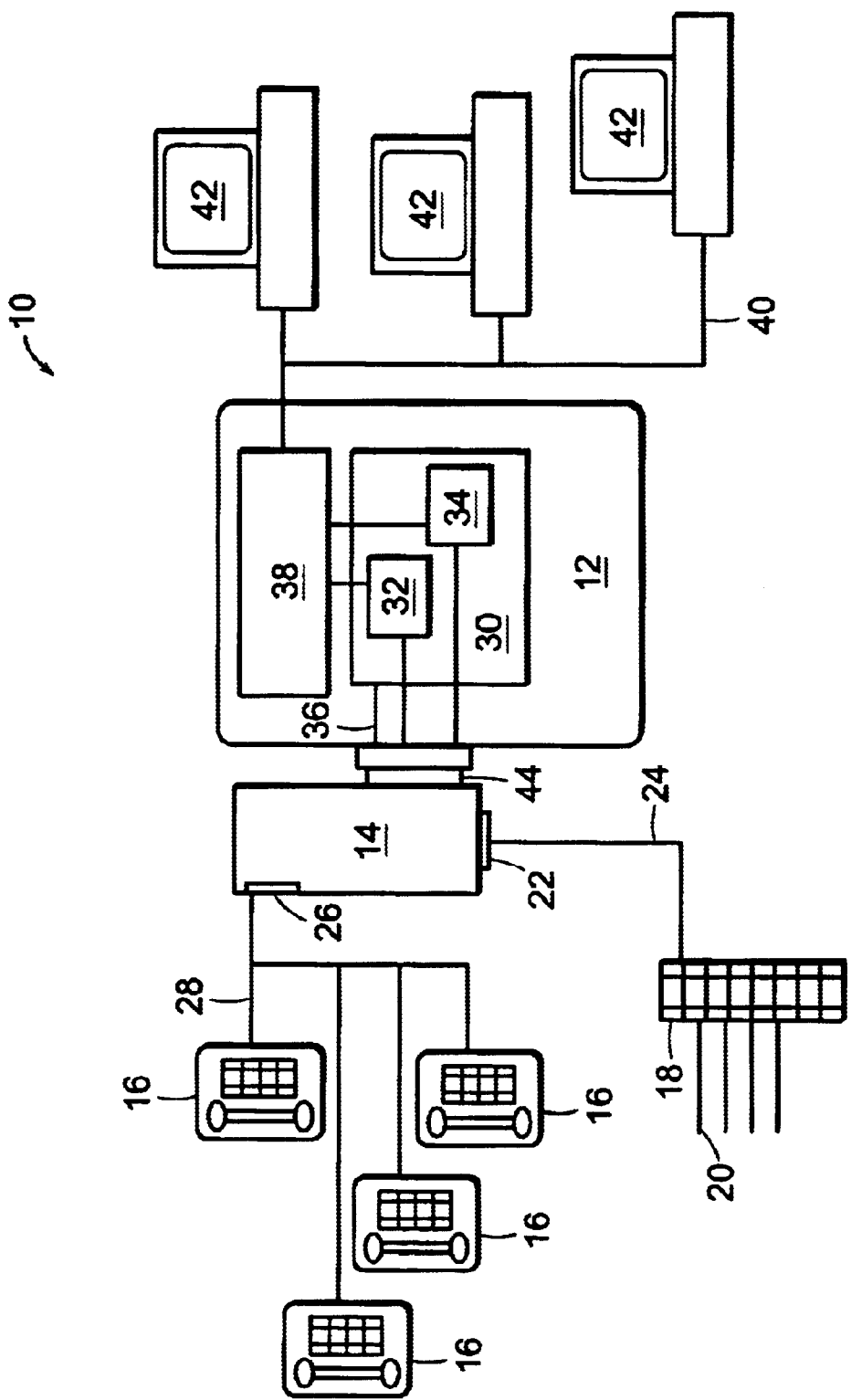
FIG. 1 is a functional block diagram of a CIT system according to the present invention.

FIG. 1 depicts a CIT system 10 according to the invention. The system 10 includes a host element 12, depicted as a local area network server, a telecom unit 14 that includes a host interface 44, telephone units 16, a trunk jack 18 that connects to trunk lines 20, a transmission path 24, a subscriber line interface 26 that connects via transmission path 28 to the telephone units 16, a message exchange interface 30, a network interface 38, a network bus 40, and client elements 42.

As depicted in FIG. 1, the CIT system 10 is an integrated system that includes a computer network system and a telecommunication unit in order that application programs running on the network can interface to and control the telecommunications unit. Specifically, as illustrated in FIG. 1, each client element 42 connects via the network bus 40 to the network interface 38. Accordingly, the host 12 collects and controls transfer of data through the network computer system. As further depicted in FIG. 1, the telecommunication equipment, including telephones 16 and the trunk lines 20, interface with the telecom unit 14. Within the host 12 the telecom unit 14 and the network interface 38 connect via the message exchange interface 30. Through the message exchange interface 30 the network system can exchange data and command signals with the telecom unit 14. Accordingly, an application program running on a client element 42 can interface via the network interface element 38 with the telecom unit 14 for passing data, requests and commands to control the operation of the telecommunication equipment, such as the telephone unit 16.

Although FIG. 1 depicts a networked CIT system, it will be apparent to one of ordinary skill in the art of telecommunications and computer engineering, that the present invention can be practiced with stand alone computer systems. Other configurations of CIT systems can be practiced with the present invention, without departing from the scope thereof.

In the CIT system depicted in FIG. 1, as will be explained in greater detail hereinafter, the message exchange interface 30 is an interface for network applications, including client/server applications, that transfers network commands and data from the network to the telecom unit 14. The telecom unit 14 includes a host interface 44 adapted to receive network commands from the message exchange interface 30 and to respond to the network commands to control the operation of the telecommunication equipment. Accordingly, the CIT system 10 includes a telecommunication system-to-host connection that logically and physically integrates the telephony and computer applications and thereby provides direct mapping between server applications running on the computer network and the telecommunication functions provided by the telecom unit 14. The invention therefore provides a telecom unit interface that operates on server application message units in its native mode. Accordingly, no translation of data and commands is necessary during transfers between the host 12 and the telecom unit 14. This provides simpler, less expensive CIT systems and further provides an improved development tool for developing CIT applications.

In a preferred embodiment of the invention, the host interface 44 includes an onboard control element that receives data and commands from the host 12 and, in response, operates the telecommunications equipment. Similarly, the host interface 44 transfers data, status and other information generated by the telecom unit 14 to the host 12. As will be explained in greater detail hereinafter, the onboard control element of the host interface 44 provides a fault-tolerant CIT system. However, it will be apparent to those of ordinary skill in the art of telecommunications and computer engineering that alternative system configurations can be practiced with the present invention without departing from the scope thereof.

The CIT system 10 depicted in FIG. 1 includes a host element 12 which is typically a local area network (LAN) server that operates as a file server for running via the bus 40 client/server applications with client elements 42. One preferred server 12 is a conventional PC compatible file server having an ISA bus slot interface and being of the type commonly used for running commercial local area networks such the Novell Netware Network System. However, it will be apparent to one of ordinary skill in the art of telecommunications and computer engineering that server 12 can be any data processing unit suitable for running computer applications, whether network applications or not, and for providing a physical interface with the telecom unit 14 for exchanging data and command signals therebetween.

The depicted telecom unit 14 is a PBX system according to the invention that includes a host interface 44 with an onboard controller for exchanging data and commands directly with the server 12 and for operating the switching functions to establish and maintain telephone calls. Such a PBX system according to the invention can be physically and logically integrated into a LAN server element, or stand alone computer, running telephony enabled applications to thereby allow the telephony enabled applications to directly communicate with the onboard controller to direct the operation of the PBX system. The depicted PBX telecom unit 14 creates circuit connections between the trunk lines 20 and the subscriber telephone units 16. In a preferred embodiment of the invention, the telecom unit 14 is an electrical circuit card assembly dimensionally adapted for fitting within a PC compatible file server and having an ISA PC bus interface for connecting into an ISA bus slot and for exchanging data between the telecom unit 14 and server 12.

The depicted telecom unit 14 is a PBX system. However, it will be obvious to one of ordinary skill in the art of telecommunications and computer engineering that the invention is not to be limited to a depicted embodiment and shall be understood to encompass other PBX systems that include an interface that directly exchanges data and commands with a telephony enabled application program and shall be understood to particularly include PBX systems that provide voice recognition, audio play and record, audio signal analysis and other similar functions. Furthermore, it will be obvious to one of ordinary skill in the art of telecommunications and computer engineering that the invention can be practiced with other telecommunications systems that exchange information with an application program, including any device that switches or multiplexes audio signals, observes audio signals or analyzes audio signals.

The PBX telecom unit 14 connects to the subscriber telephones 16 via a standard subscriber loop interface which will be described in greater detail hereinafter. Each telephone unit 16 can be a conventional analog telephone unit, a digital telephone unit, a digital data device, or any other piece of data communication equipment that can connect to the subscriber interface of a PBX. The telecom unit 14 further connects to the trunk lines 20. The trunk lines 20 can be conventional analog telephone trunk lines of the type commonly provided by the public switching telephone network (PSTN). The telecom unit 14 can also be adapted to connect with other carrier systems including the T carrier systems, such as the T1, T1C, and FT-4E-144 systems, as well as ISDN systems and other alternative carrier systems. These modifications, additions and substitutions are within the skill of an ordinary skilled telecommunication engineer and are within the scope of the invention.

As depicted by FIG. 1, the illustrated trunk lines 20 connect to an optional jack unit 18. Transmission path 24 that connects between the jack 18 and the telecom unit 14 can be conventional lead lines of the type commonly employed for connecting a telephone trunk jack with a PBX system. The depicted PBX telecom unit 14 includes a switching mechanism that establishes circuit connections between the depicted telephone trunk lines 20 provided by the PSTN and one or more of the telephone units 16. The PBX telecom unit 14 establishes these circuit connections as a function of the information transmitted through the trunk lines 20 and the data and command signals received from client/server applications running on the network 40.

FIG. 1 further depicts that the server 12 includes a network interface 38 which couples via network 40 to the client elements 42. Each element 42 is a conventional data processing element, such as a PC compatible computer, a VAX system, a UNIX system, or any data processing unit. The network interface 3 8 is understood to represent those elements of the server 12 that operate the network 40. In one typical embodiment, the network interface 38 includes a network interface card of the type commonly used for connecting to a conventional computer network. The host processor element 38 typically further includes those elements necessary for storing and operating a network operating system (NOS) and for storing and running client/server applications. The network 40 depicted in FIG. 1 is a transmission path between the network interface card 38 and the client elements 42.

Figure 3:
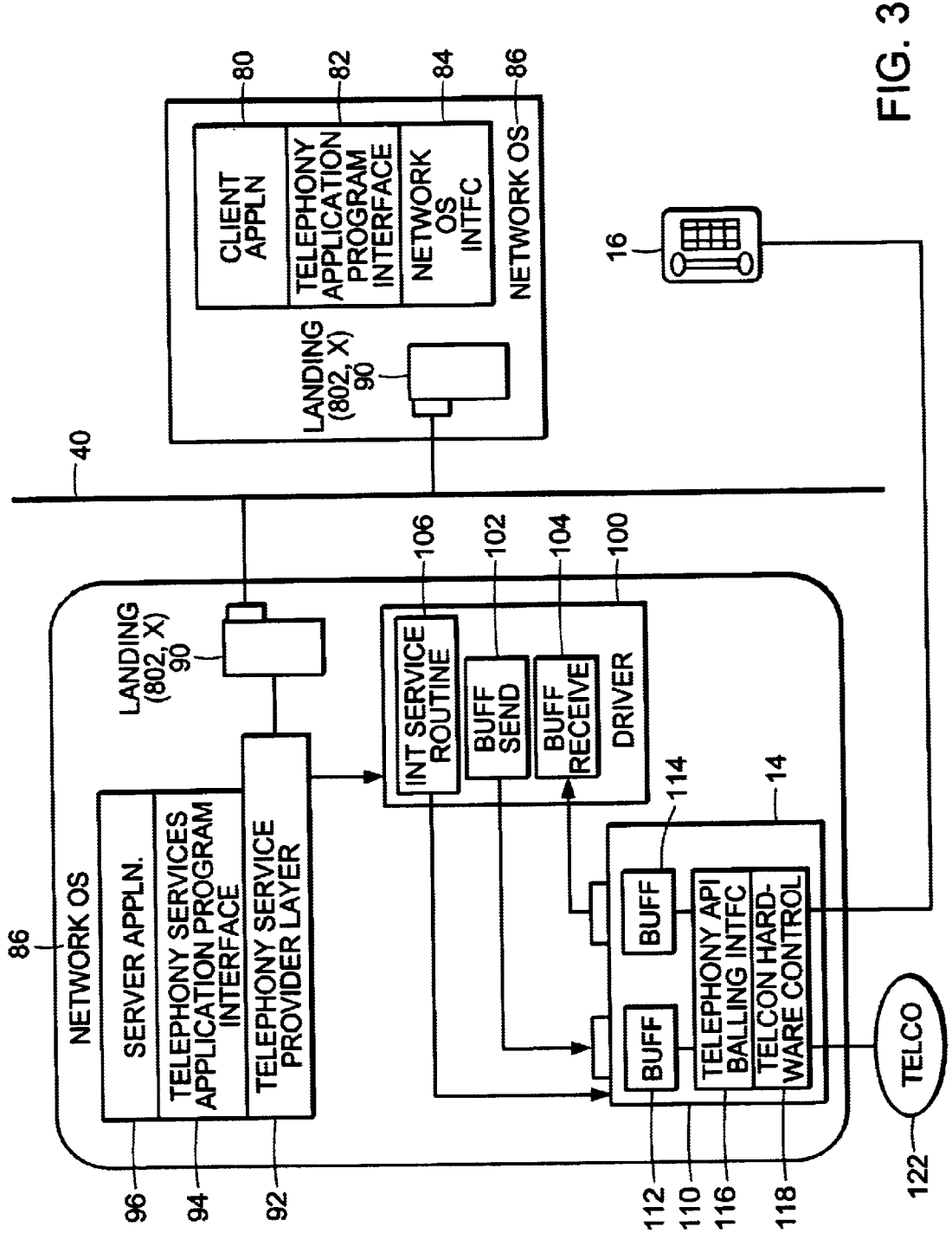
FIG. 3 is a block diagram of the software and hardware components of a CIT system according to the present invention.

In one preferred embodiment of the invention the network is a Novell or Novell compliant network that runs Telephony Services Application Programming Interface (TSAPI) applications. However, it should be apparent to one of ordinary skill in the art that any computer network which interfaces plural computer elements and exchanges data and command signals between computer elements can be practiced with the present invention without departing from the scope thereof. Moreover, the present invention can be practiced with any CSTA compliant public interface as well as other public interfaces including the Telephony Services Application Programming Interface (TAPI) system sold by the Microsoft company of Redmond, Washington. Additionally, it will be apparent to one of ordinary skill in the art of telecommunications and computer engineering that the invention can be practiced with stand alone systems wherein a stand alone computer device directly interfaces with the telecom unit 14 for exchanging information therewith. Accordingly, it will be understood that in the stand alone embodiment of the invention the network components depicted in FIGS. 1 and 3 are unnecessary.

Figure 2:
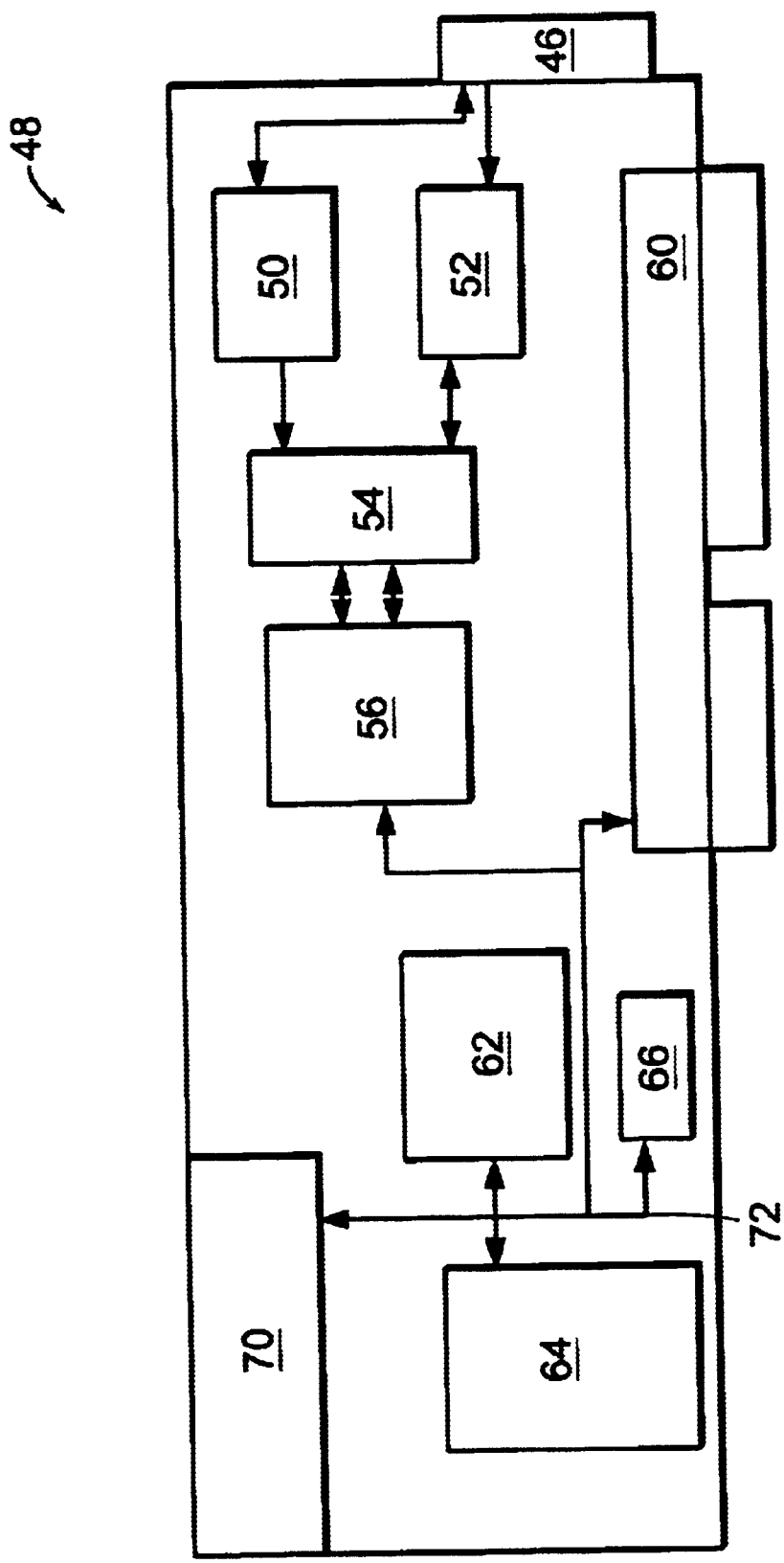
FIG. 2 is a functional block diagram of a PBX system according to the present invention suitable for integration into the server of a local area network.

One PBX telecom unit 14 is the PBX system 48 depicted in FIG. 2 that includes a TELCO connector 46 that connects to both subscriber lines and PSTN trunk lines, a trunk interface 50, a subscriber interface 52, a CODEC element 54, a switch element 56, an ISA interface 66, a processor element 62, a RAM element 64, a ROM element 60, and an optional expansion interface 70.

The TELCO connector 46 depicted in FIG. 2 is a conventional 50-pin TELCO RJ21X connector. In one embodiment of the invention, six analog trunks and eighteen extension lines come onto the PBX system via the connector 46. Typically the PBX system 48 provides line protection for each of the trunk and extension lines that connect in circuit to the TELCO interface 46. In a preferred embodiment of the invention, the PBX system 48 provides a solid state auto resetting surge and lightning protector to protect each extension and trunk line connected by TELCO connector 46. In a further preferred embodiment of the invention, PBX system 48 includes a relay switch that connects in electrical circuit to the power supply of the PBX system 48. In the event of system power failure, the relays configure to switch one trunk line through to one extension. Accordingly, in the event of power failure, the relay element establishes a dedicated telephone circuit connection between the PSTN and a designated one of the telephones, DTE's, DCE's, DSE's, or any other end user machine. In an alternative embodiment, the PBX system 48 is an all extension line PBX system that includes an interface that connects only to internal extension lines for establishing call connections between these extension lines.

The depicted trunk interface 50 couples the PBX system 48 to the trunk lines of a PSTN system. Trunk interface 50 includes an electrical circuit with solid state relays to control ring and hang-up detection, battery and ring feed, off-hook detection and 2:4 wire conversions. The trunk interface 50 can connect to loop start trunks and can support DID and DNIS trunks. Optionally, trunk interface 50 includes caller ID logic to decode the trunk PSK format caller ID information for reading by the PBX system 48 In alternative embodiments of the invention. the trunk interface 50 can be adapted to couple the PBX system 48 to alternative carrier systems including T1, fiber optic and ISDN lines. FIG. 2 further depicts subscriber line interface element 52 that is a conventional subscriber line interface circuit and is configured similar to the trunk interface element 50. In one embodiment of the invention. the PBX system 48 is an all trunk PBX system that includes an interface to plural trunk lines for establishing call connections between the lines of the trunks.

CODEC element 54 can be a conventional CODEC element for converting analog signals of an analog trunk and subscriber lines to a pulse code modulated (PCM) serial data stream. In a preferred embodiment of the invention, the CODEC element 54 converts analog output signals to an 8-bit $\mu$ law PCM serial data stream at a sampling rate of approximately 8 kilohertz. Alternatively, the CODEC elements 54 can be of the type that employ linear encoding/decoding techniques, such as the A law technique, for converting analog signals of the analog trunk and subscriber lines to a PCM serial data stream. Other coding processes can be practiced with the present invention without departing from the scope thereof.

Switch element 56 is preferably a time division multiplexing (TDM) switching matrix of the type commonly employed for full digital switching. These switches are well known in the art of telecommunications and computer engineering for providing sufficient switching rates to accommodate the switching of PCM data. Preferably switching element 56 has a non-blocking architecture.

In one preferred embodiment of the invention, switch element 56 is a MUSAC-based time switch. This switch receives eight 32-channel PCM streams and properly switches those channels to eight 32-channel output streams. Sixty-four of the overall 256 channels can participate in conferenceing. The onboard controller properly adds together the conferenced channels and distributes back to the output stream. The controller element can operate the switch so the 64 conference channels can all be in one conference or be broken into smaller size conferences. The digital switch element 56 also provides the path from the stations/trunk to any voice processing hardware. Preferably all switching is digital to thereby allow that any station or trunk can employ voice processing functions available on the PBX system 48. One MUSAC digital switch element 56 suitable for practice with the present invention is the PEB 2245 switch manufactured by the Siemens Corporation of Germany.

FIG. 2 further depicts that controller element 62 connects via a bus 72 to a RAM element 64, ROM element 66, and a ISA PC bus interface 60. In one embodiment of the invention the controller element 62 includes a 20 megahertz Intel 80C186 microprocessor and two FPGA devices that couple to the microprocessor and implement support logic. The controller further connects to a 512 KB static RAM element and a 256 KB flash ROM element, which is preferably a EEProm to allow for modification of onboard programs. The RAM provides audio channel buffer space, board-to-host message storage space and configuration table storage space. The ROM contains storage space for a controller operating program that includes a calling interface which will be described in greater detail hereinafter. The CPU 62 controls operation of the ISA PC bus interface to control the exchange of message data units between the PBX system 48 and the LAN 40. Accordingly, these elements operate as the host interface 44 depicted in FIG. 1.

In one embodiment the controller 62 operates responsive to a controller operating program within the ROM element 66 that directs the controller and FPGA support logic through a series of tasks. The operating program provides instructions for time related tasks and interrupt related tasks. The time related tasks include servicing the CODEC elements, typically every 125$\mu$ seconds, controlling ring relays to turn ring relays on and off at a selected cadence, and time outs for off-hook alerts. The interrupt related activities include call processing such as off-hook/on-hook interrupts, caller Id service that typically services a UART port of the caller Id logic, board-to-board communication services, including servicing an HDLC circuit of the expansion interface 70, and operating the ISA interface for implementing a message bus that provides data exchange with the host 12, including message unit exchange and audio data exchange. The code for the board-to-board communications and for the calling interface are described in greater detail hereinafter. The call processing operating program follows from conventional principles of telecommunications and computer engineering and can be any call processing operating program suitable for use with the depicted PBX system 48, or suited for other telecommunication equipment according to the invention.

In a preferred embodiment, the telecom unit 14 includes an onboard power supply 67 that supplies power to the telecommunication equipment to maintain operation during deactivation of the server 12. In the depicted PBX system 48 the controller element 62 includes an onboard power system that supplies power to each element depicted in FIG. 2 and to each telephone line supply. By providing the controller element 62 with an onboard power supply, the PBX system 48 is able to maintain all processing functions during shutdown of the server 12. Typically, the operating program includes call control functions that respond to commands that are entered through the keypad of the telephone units 16 to also allow more advanced call processing operations such as call transfers, call forwarding and other such operations.

The PBX system 48 depicted in FIG. 2 includes an optional expansion interface 70. The expansion interface 70 allows multiple telecom units, such as PBX system 48, to be coupled together to provide an expanded PBX system that can receive and control additional trunk lines and subscriber lines. To this end, the depicted PBX system 48 has a modular design to allow for multiple ones of these PBX systems to be daisy chained together to form a larger PBX system with expanded capabilities. In the depicted embodiment, each PBX system separately includes elements for operating as a PBX system, including a TELCO interface, a CODEC, a switching component and a control processor. Accordingly, each system 48 is a complete system that provides all capabilities necessary to operate as an advanced PBX system. Each PBX system 48 further includes an onboard jumper that is registered into a status register. The jumper provides a status signal that indicates which of the PBX systems 48 will operate as the master unit and control the exchange of data among the daisy-chained boards. Although this modular structure is a preferred embodiment of the invention, it will be apparent to those of ordinary skill in the art of telecommunications and computer engineering, that other system designs can be employed with the present invention to provide for expandable telecom units that can be integrated into a computer.

One preferred expansion interface 70 is a PCM highway implemented through the SCSA bus standard to provide board-to-board switching. In one embodiment the expansion interface is an SCSA interface that includes a Dialogic SC 2000 chip, manufactured and sold by the VTI Corporation. The SC 2000 chip is designed to facilitate the implementation of PCM highways and thereby allow multiple telecom systems to be daisy-chained together to form larger systems. Additional board-to-board communication, such as time slot assignments on the PCM highway or call offerings, is performed by a Siemens communications chip such as the HDLC SAB82526 as well as the processor element 62. In the system depicted in FIG. 2, interboard communications are interrupt driven. The expansion interface 70 provides an interrupt status line to the controller element 62. The interrupt status line connects to a FPGA of the controller element 62 to drive the processor interrupt signal. The processor services the interface 70 to exchange data among the multiple PBX systems 48 that are daisy-chained together. However, it will be apparent to one of ordinary skill in the art of telecommunications and computer engineering that other systems and processes for interboard communications can be practiced with the present invention without departing from the scope thereof.

FIG. 3 depicts in block diagram form the software architecture of the networked CIT system 10 depicted in FIG. 1. As depicted in FIG. 3, a networked system 10 according to the present invention allows telephony enabled applications running on a client processor to control the operation of telecommunication equipment integrated into a server. A telephony enabled client application runs on a client processor such as the client element 42 depicted in FIG. 1. The client application software layer 80 interfaces with a telephony services application program interface 82, which interfaces with a client network operating system interface 84, which allows the client application 80 to interface, through network interface card (NIC) 90, with the client network operating system 86. The client network operating system 86 provides, in part, for the exchange of information through the local area network element 40, thus providing for the transfer of data between the client element 42 and the server element 12. As further depicted by FIG. 3, a LAN adapter NIC 91 provides for the exchange of information across the LAN 40. The LAN adapter NIC 91 provides hardware support for the network interface software 92, which enables the server 12 to exchange information with the client processors 42 on network 40.

As further depicted by FIG. 3, telephony enabled server applications 96 can run on the server 12 and interface with the telephony services application program interface (API) 94, which interfaces with the telephony service support layer 92. The telephony service support layer 92 passes message units to the driver element 100 that employs the interrupt service routine 106 to exchange message units with the telephony API calling interface 116 that can exchange data and control signals with the telecom hardware control software 118.

The depicted software architecture of FIG. 3 is representative of one suitable software architecture for a telecom unit 14 that is integrated according to the present invention into a computer network 40 for servicing client/server applications running on the network. However, it will be apparent to one of ordinary skill in the art of telecommunications and computer engineering that other software architectures can be practiced with the present invention. For example, in a stand-alone environment network software interfaces are unnecessary and running applications can interface with a library of functions that act as an application program interface that can exchange data and control signals with the telecom hardware control software 118. Other suitable software modifications will be apparent to one of ordinary skill in the art of telecommunications and computer engineering.

The telephony enabled client application 80 depicted in FIG. 3 can be any telephony application that responds to or generates requests for any telecommunications equipment that has a physical and logical connection with the client network operating system NOS 86. In one typical example, the telephony enabled client application 80 is a program that monitors and directs incoming telephone calls by requesting from the telecom equipment 14 information representative of a caller ID signal and correlating the caller ID signal with a database of account information for transferring the incoming telephone call to an appropriate telephone station and for similarly forwarding the corresponding database information to the appropriate workstation.

As depicted in FIG. 3, the telephony enabled client application 80 is a software program that employs a telephony application programming interface 82 to operate the telecom equipment 14. The telephony application program interface 82 is typically a collection of functions and data structures that provide the necessary low level software commands suitable for describing the necessary telecommunication operations and data exchanges that need to occur to service the requests of the client application 80. One suitable telephony application programming interface is the TSAPI interface developed and sold by the Novell Corporation of Provo, Utah, another is the TAPI interface developed and sold by the Microsoft Corporation of Redmond Washington. However, any telephony service application programming interface that supports telephony control capabilities in a generic, switch independent way is suitable for practice with the present invention.

Client application 80 and the telephony application programming interface 82 employ the network operating system interface 84 to access the client NOS 86 for transferring messages across the network 40 to the server element integrated with the telecom unit 14. In one embodiment of the invention, the network operating system is the Novell Netware system sold by the Novell Corporation of Provo, Utah. However, it should be apparent to one of ordinary skill in the art of telecommunications and computer programming that any network operating system suitable for transferring message units over the network 40 can be practiced with the present invention without departing from the scope thereof. As further depicted by FIG. 3, the server. like the client elements, can run telephony enabled applications, such as the telephony enabled server application 96 depicted in FIG. 3. As described with reference to the client element, the telephony enabled server applications 96 can interface with the telephony services application programming interface 94, which provides the capabilities for interfacing with a telecom unit for maintaining call control. The telephony enabled server application 96 and the application programming interface 94 interface with the NOS 86 through the telephony service provider program 92 that allows messages to be passed between the server application 96 and the NOS 86.

FIG. 3 depicts that message units generated by the client application 80 for the server application 96 are passed through the telephony service provider 92 to the driver element 100. The driver element 100 operates the interrupt service routine 106 for transferring message units under the control of the server network operating System NOS 89 to the software running on the telecom unit 14. In one embodiment of the invention, each message unit is a CSTA compliant data structure generated by the either telephony service application interface 82 or 94.

In the depicted embodiment, the driver element 100 receives message units from the NOS 86 and stores the message units in a send buffer 102. The driver element 100 sends an interrupt to the interrupt service routine 106 which activates the telecom unit 14 to collect the data from the send buffer 102 and store it in the buffer 112 on board the telecom unit 14. Message units in the data buffer 112 are available to the calling interface 116 maintained on board the telecom unit 14. The calling interface 116 employs the message units to operate the telecom hardware control software 118 that controls the hardware elements of telecom unit 14.

As further depicted by FIG. 3, the telecom unit 14 provides a buffer element 114 that can be used for passing message units from the telecom unit 14 to the server NOS 87 and which operates in a similar manner as the interface between the driver 100 and the telecom unit 14. In a typical operation, the hardware of the telecom unit 14 provides status or event information to the telecom hardware control software 118, such as providing a line busy signal. The telecom hardware control program 118 passes the status or event information to the calling interface 116 that generates a network compatible message unit. The calling interface 116 provides the network compatible message unit to the buffer 114 and indicates the buffer to be full. The interrupt service routine 106 detects the buffer full flag and signals the driver element 100 to collect the message unit from the buffer 114 and store the message unit into the receive buffer 104. Once the driver element 100 completes the read of buffer 114, the message unit stored in the receive buffer 104 are passed to the server provider layer 92. The network operating system interface 92 reads the destination information of the message units, and routes the message units to the proper telephony enabled application program, such as the application programming interface 82 of the client application 80. The application programming interface 82 decodes the message unit and provides the necessary high level information to the client application 80. Client application 80 responds to the high level information and proceeds with the application.

With reference to FIG. 3 an example of a client telephony service request according to the invention can be described. The client application 80 makes a service call using the telephony application program interface 82. For example, the client application 80 can request to make a call through the telecom unit 14. In a preferred embodiment, the telephony application program interface 82, such as the Novell TSAPI or Microsoft TAPI public interfaces, includes a subroutine "make call" which conforms to the CSTA protocol. The client makes the service request and the telephony application program interface 82 builds a message unit to transfer to the telecom unit 14.

In a preferred embodiment of the invention, the telephony application program interface 82 builds a message according to the CSTA protocol. One such message unit is depicted in FIG. 4. The message unit includes a driver control block (DCB) structure 121 and a request block 123. The DCB header includes ten information signals for classifying and routing the message to the telecom unit 14 and the request block 123 contains information for implementing the requested service.

In the message unit depicted in FIG. 4, the DCB block is a data structure of the type employed by the Novell TSAPI public interface. This block includes a message offset signal for identifying the relative memory location of the request block 123, a message length block for indicating the size of the request block 124, and a class_of_service message signal to indicate the type of request being made by the client application. Other data signals, including private Offset, private length, sessionID, monitorCrossRefID and invokeID are provided for uniquely identifying the message block and for providing header information that allows for the proper delivery by the system of the request block 124. Although the depicted DCB 122 represents DCB data structure according to the Novell TSAPI public interface, it will be apparent to one of ordinary skill in the art of telecommunications and computer engineering that any other suitable public interface can be practiced with the present invention without departing from the scope thereof.

The request block 123 depicted in FIG. 4 includes a callingDevice signal and a calledDevice signal. The callingDevice signal identifies the device initiating the call. For example, the calling Device signal can represent the internal extension line connected to the telecom unit 14. The calledDevice signal can indicate the telephone number being dialed by the telecom unit 14. The depicted request block 124 represents a data structure of the Novell TSAPI public interface. However, any other suitable public interface can be practiced with the present invention without departing from the scope thereof. The telephony services application program interface 92 passes the message to the driver 100 and, as described above, the driver 100 passes the message to the telecom unit 14.

The calling interface 116 of the telecom unit 14 directly processes the message unit to operate the telecom hardware control 118 and perform the requested service. In one embodiment, the calling interface 116 includes a dispatch and switch program element that operates on the message unit in the buffer 112. The structure of one embodiment of a suitable calling interface dispatch and switch element can be described with reference to the following example code that illustrates the direct processing of a CSTA_MAKE_CALL service.

```
/* The following is an example of a platform neutral telephony service
application
** program public interface message service that operates on a message
unit
** in an input buffer and produces a reply message unit in a result buffer.
**
** Inputs:
**      inBuffer    pointer to incoming message unit
**      outBuffer   pointer to space for reply message unit (big
                    enough for max)
** Returns:
**      -1   error or failure, failure message unit in outBuffer to be sent
**       0   error, could not build reply message Unit
**       1   success, reply message unit in outBuffer to be sent
LOCALDEF int NBmessageHandler(void far *inBuffer,void far
*outBuffer)
{
/* declare pointers to the input and output buffers */
    TDIDriverControlBlock_t far *inDCB = (TDIDriverControlBlock_t
    far *)inBuffer;
    TDIDriverControlBlock_t far *OutDCB =
    (TDIDriverControlBlock_t far
*)outBuffer;
/* declare pointers for the message unit and the reply message unit */
    void far *pMsg;
    void far *pReply;
/* check in the input and output buffer pointers are set */
    if(outDCB == NULL) return 0;
    if(inDCB == NULL) return 0;
/* assign the pointers for the message unit and the reply message unit */
    pMsg = &((char far *)inDCB)[inDCB->messageOffset];/*
the message unit pointer is directed to the request
block 124*/
    pReply = &((char far *)outBuffer)[sizeof(TDIDriverControlBlock_
    t)];
/* copy and initialize header information for the reply message unit */
    _fmemcpy(outDCB,inDCB,sizeof(TDIDriverControlBlock_t);
    outDCB->privateOffset = 0;
    outDCB->privateLength = 0;
    outDCB->messageOffset = sizeof(TDIDriverControlBlock_t);
    outDCB->messageLength = 0;
    outDCB->monitorCrossRefID = 0;/* will be set as the message is
    shipped */
/*Begin the dispatch and switch operation*/
    switch (inDCB->messageClass)/* switch on the type of message */{
        case ACSREQUEST:
            outDCB->messageClass = ACSCONFIRMATION;/* establish
                                                    and
intialize                                           class of
reply message unit */
            switch (inDCB->messageType)/* switch on message type */{
                  .
                  .
                case CSTA_MAKE_CALL:*/ the
                CSTA_MAKE_CALL code is activated */
```

-continued

```
{
    LINE_ID callerID;
    CALL_ID callID;
    CSTAMakeCall_t far *pMake = pMsg;
    CSTAMakeCallConfEvent_t far *pCall = pReply;
    outDCB->messageLength
        = sizeof(CSTAMakeCallConfEvent_t);/* set size
            of reply message
            unit */
    outDCB->messageType =
        CSTA_MAKE_CALL_CONF;/* set type of reply
            message unit */
    callerID = lookupDeviceID(pMake->callingDevice);/*
        get local representation of
            the caller */
    if (callerID == NO_LINE) {
        cstaFail(outDCB,INVALID_CALLING_DEVICE);
        return -1;
    };
    /* create a phone call */
    callID = callDeviceToDevice(callerID,pMake->
        calledDevice);
    if (callID == NO_CALL) {
        cstaFail(outDCB,INVALID_CALLED_DEVICE);
        return -1;
    };
    pCall->newCall.callID = encodeCallID(callID);/*
        create an external representation of an
            internal callID*/
    _fmemcpy(pCall->newCall.deviceID,pMake->
        callingDevice,
            DIM(p.Call->newCall.deviceID));/
    pCall->newCall.devIDType = STATIC_ID;/*
        define the type of ID created */
            device
    return 1;
}
    .
    .
    .
}
default:
};
return 0;
}
```

As can be seen from the above code, the calling interface 116 collects the message unit from the buffer 112 whose location in the host 12 memory is given by the variable inBuffer. Once the message unit is collected, the calling interface 116 accesses the information in the DCB block 121 and request block 123 to operate the switching of the telecom unit 14.

First, the calling interface 116 accesses the inDCB->messageClass signal to determine the type of class of the request being made by the client application 80. This allows the calling interface 116 to determine the type of reply message unit to generate and to transfer back to the client application 80. In the example, the message unit is of class ACSREQUEST, and the calling interface 116 sets the reply message Unit outDCB->messageClass signal to ACSCONFIRMATION.

In a subsequent step, the calling interface 116 accesses the segment of the message unit, inDCB->messageType, that identifies which service request was made by the client application 80. Once the type of service request is determined the calling interface 116 activates code to implement the requested service. The code accesses the telecom hardware control program 118 to operate the switching element 56 to implement the requested service. For example, in response to the make_call request, the calling interface 116 calls the callDeviceToDeviceO function to configure the switch 56 and to return a message that identifies the newly established connection.

As further illustrated by the above example code, the calling interface 116 also prepares a reply message unit for transferring to the client application 80. In the example code, the reply message unit is a make_call_confirm type given by the signal CSTA_MAKE_CALL_CONF. As described above with reference to FIG. 3, the calling interface employs the interrupt service routine to transfer the reply message buffer to the telephony service layer 92, which can transfer the reply message unit to the client application 80. This reply message unit provides the client application 80 with information to continue processing the telephony application.

The above describes a transfer of message units between a client application 80 and the calling interface 116 of the telecom unit 14 where the message units include data that instruct the telecom unit 14, in this case a PBX system, to perform call control and other functions. However, the telecom unit 14 and the server 12 can also exchange audio data. In this further embodiment of the invention, the server element 12 includes a file memory that contains files of audio information. The client application 80 and calling interface 116, described above, can play audio information by queuing up audio files stored in the file memory and transferring data from these audio files between the server 12 and the telecom unit 14. This audio data can be played through the switch 56 and CODEC elements 54 to a handset 16 or other device. Similarly, the client application 80 and calling interface 116 can be employed to record audio information received through a handset 16, digitally encoded by the CODEC elements 54 and transferred by the calling interface 116 to an audio file stored for example on the server element 12.

In operation the system 10 plays an audio file, such as a prerecorded voicemail message, by the client application 80 queuing an audio file stored on the server 12 and transferring the audio file to the telecom unit 14. In one example, the client application 80 passes, as described above, a message unit that instructs the telecom unit 14 to play an audio file stored on the system, such as on the server 12 to a particular caller. The audio file can be any file of information that encodes audio information in a format suitable for transfer to the telecom unit 14. In one embodiment of the invention, the telecom unit 14 is a PBX system and the audio file contains digital information representative of digitally encoded voice signals which are suitable for transferring to the PBX system 14 and being passed through the CODEC element 54, to generate audio signals for the handset 16.

The telecom unit 14 reads the message unit passed by client application 80 and identifies the caller who is to receive the audio information. The telecom unit 14 through calling interface 116 passes, as described above, a message unit back to the client application 80 instructing the client application 80 to pass the audio file to an internal buffer. In one embodiment of the invention the client application 80 receives the message unit from the calling interface 116 and transfers the audio file to the buffer 102 providing the transfer on a continuous basis until the end of the audio file is reached. Once the calling interface 116 has received the audio file information, it can transfer this information to the caller of interest. In one embodiment of the invention, the telecom unit 14 reads the audio information from an internal buffer one byte at a time on a continuous basis. Each byte is transferred immediately to a dedicated channel of the switch 56 which is configured to transfer the audio information to the proper device. Each byte is transferred until the end of the file is reached. A record audio function operates in a similar manner as the play audio feature described above with the sequence of steps occurring in the reverse order. It will be apparent to one of ordinary skill in the art of telecommunications and computer engineering that any system suitable for transferring a file of audio information from the server 12 to the telecom unit 14 can be practiced with the present invention without departing from the scope thereof. Moreover, it will similarly be apparent to one of ordinary skill in the art of telecommunications and computer engineering that the described play audio and record audio feature can be practiced with the present invention configured in a stand-alone computer system that includes one or more files of audio information.

In another embodiment of the present invention, the system 10 described herein can be configured to receive audio data files from remote network locations and for playing these audio data files to the telecom unit 14 for transfer to a telephone unit 16. The system 10 can be adapted to record audio data files and transfer these audio data files through a network system to be played at a remote location. In this way, the system 10 can be configured with two or more server integrated PBX systems, internetworked together to pass files between the server elements. In this configuration, connections can be established across the internetworked system to employ the computer network as a phone network system.

Figure 5:
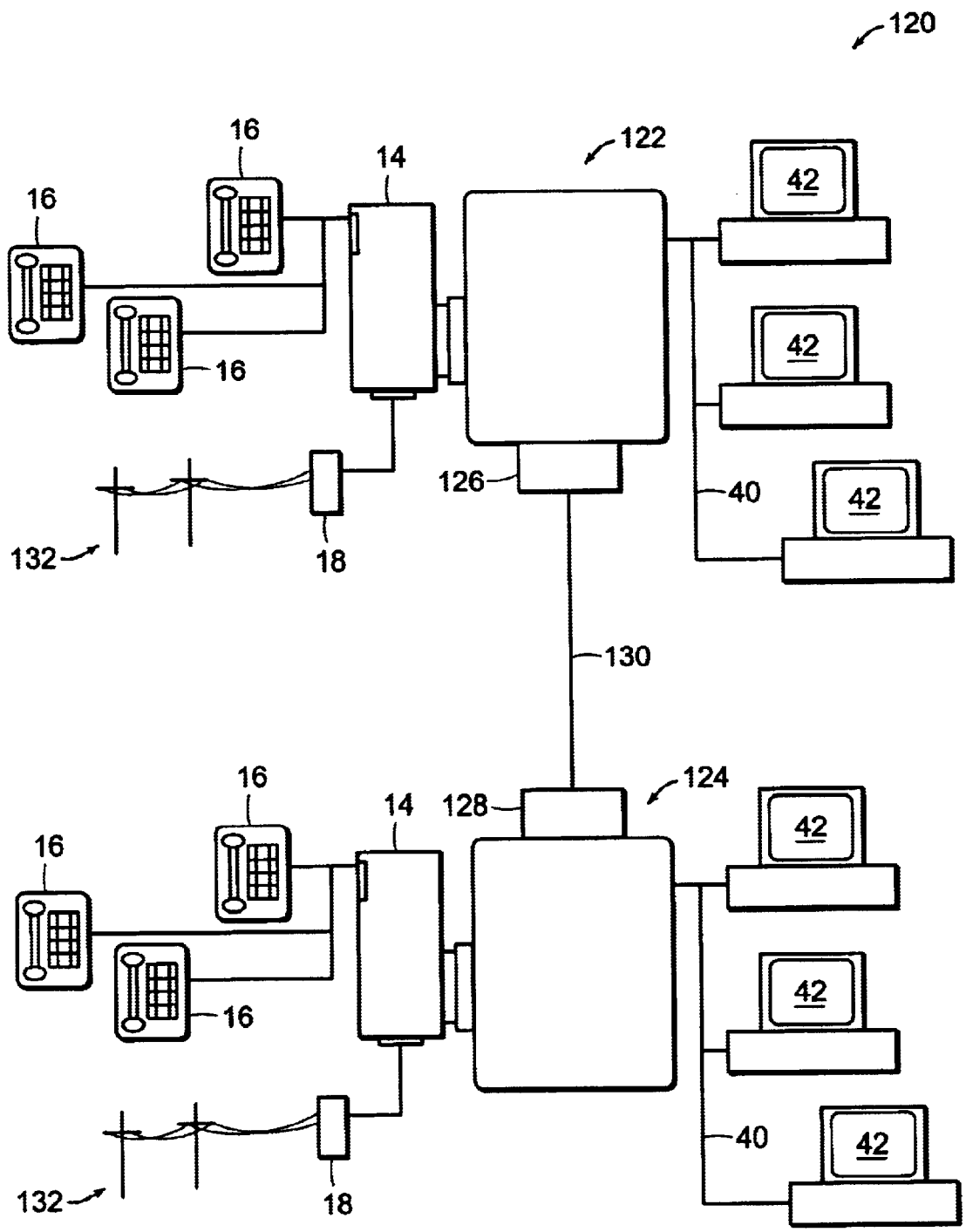
FIG. 5 depicts an internetworked system for transferring data between two or more systems according to the present invention.

One such internetworked system 120 is depicted by FIG. 5. FIG. 5 illustrates an internetworked system 120 that includes a first server integrated PBX system 122, a second server integrated PBX system 124, an internetwork interface 126 coupled to the system 122, an internetwork interface 128 coupled to the system 124, and an internetwork transmission path 130 connected between the internetwork interface elements 126 and 128.

As depicted in FIG. 5, the system 120 provides an internetwork interface between the two network server 122 and 124, each of which is constructed according to the present invention. The internetwork connection can be any type of internetwork connection for transferring information between two or more networks, for example, it can comprise a TCP/IP network interface. It will be apparent to one of ordinary skill in the art of telecommunications and computer engineering that any interface suitable for exchanging information between two network systems can be practiced with the present invention without departing from the scope thereof.

As depicted in FIG. 5, the server 122 includes a telecom unit 14 according to the present invention, telephone units 16, and client elements 42 connected to the server element via the network 40. In one embodiment of the invention a client application 80 running on a client element 42 monitors the incoming calls to the telecom unit 14 which is a PBX system according to the invention. The client application 80 identifies each called device, such as an internal extension line connected to a telephone unit such as one of the depicted telephone units 16. The client application 80 includes a table that identifies the network location of each interface, including each internal extension line. If an incoming call to server 122 is directed to a device connected to the PBX system 14 of the server 124, the client application 80 can provide the incoming call with access to the record audio system described above, allowing the incoming caller to create a voicemail audio data file. Upon termination of the incoming call, the client element 80 transfers the voicemail audio data file to the internet network interface 126 that transfers the voicemail audio data file via the network transmission path 130 to the internet network interface 128 of system 124. The internetwork interface element (INI) 128 can store the voice message audio data file in the appropriate location of file memory so that the system 124 can indicate to the called device that a recorded voice message is available to be accessed. In this way, the system depicted in FIG. 5 allows for the transfer of audio data signals between telephone devices, such as the telephone unit 16, that are physically connected to different network systems. Although the system is described with reference to a voicemail application, it will be apparent to one of ordinary skill in the art that real time voice data may also be exchanged without departing from the scope of the present invention.

As can be seen from the above description, the telecom unit 14 provides a telephony API calling interface 116 that responds to and generates LAN-compatible message units. In a preferred embodiment of the invention, the telephony API calling interface handles calls using the CSTA standard model. However, other CIT standard definitions for computer supported telecommunications can be practiced with the invention without departing from the scope thereof. It will also be appreciated by those skilled in the art that changes can be made to the embodiments described above without departing from the broad inventive concept thereof. For example, certain elements of the illustrated embodiments are described as circuit card assemblies or software modules; however, it will be apparent to one of ordinary skill in the art that the embodiment of these elements as software or hardware modules can typically be interchanged or supplemented depending upon system requirements including speed of processing, size, expense or other design criteria. It is understood, therefore, that this invention is not limited to the particular embodiments disclosed, but it is intended to cover modifications within the spirit and scope of the present invention as defined by the appended claims.

We claim:

1. A PBX system implemented on a printed circuit board and adapted for interfacing to a server of a computer network, comprising a carrier interface for coupling to a plurality of carrier lines suitable for transmitting signals, including power, to at least one telephone handset, a subscriber interface for coupling to a plurality of subscriber lines, each of said subscriber lines suitable for transmitting signals to said at least one telephone handset, a server interface having a bus port adapted for connecting to a bus slot of said server to form a data path with said server, a controller element in electrical circuit with said bus port for transferring message units across said data path and for generating control signals responsive to said message units, and a switch element coupled to said carrier interface and said subscriber interface and said controller element for establishing circuits between said carrier lines and said subscriber lines in response to said control signals.

2. A system according to claim 1 wherein said carrier interface comprises a trunk interface for coupling to a trunk line.

3. A system according to claim 1 wherein said subscriber interface comprises a subscriber loop interface for coupling to a plurality of extension lines.

4. A system according to claim 1 wherein said controller element includes a processor element and is connected to a memory element having a calling interface element for operating said processor element to generate said control signals responsive to said message units.

5. A system according to claim 4 wherein each said message unit includes a message-type signal and said calling interface element includes a switch element responsive to said message-type signal for generating said control signals.

6. A system according to claim 4 wherein said calling interface element is adapted to operate said controller element responsive to CSTA (Computer Supported Telephony Application) compliant message units.

7. A system according to claim 4 wherein said calling interface includes means for generating message units for transfer to said server interface.

8. A system according to claim 7 wherein said means for generating message units includes means for generating CSTA (Computer Supported Telephony Application) compliant message units.

9. A system according to claim 4 wherein said memory element stores said calling interface element in a memory as embedded code.

10. A system according to claim 1 further comprising an exchange interface for coupling to a second system for exchanging message units between plural systems.

11. A system according to claim 10 wherein said exchange interface includes an SCSA (Signal Computing System Architecture) interface for providing a daisy chain interface among plural systems.

12. A system according to claim 1 wherein said controller element includes audio data transfer means for transferring data representative of audio signals to said server.

13. A system according to claim 1 wherein said controller element further includes a memory element for storing a call control program element for controlling said switch element to implement a set of telecommunication functions.

14. A system according to claim 13 further comprising an onboard power supply element for supplying power to said controller element for fault tolerant operation.

15. A network server system, comprising
   a message bus for carrying message units to a server,
   a branch exchange element having
      a server interface element for controlling the transfer of said message units across said message bus,
      a bus port connected to said message bus for forming a data path,
      a trunk interface for coupling to one or more trunk lines,
      a subscriber loop interface for coupling to a plurality of extension lines to carry signals to at least one telephone handset,
      a controller element in electrical circuit with said bus port for transferring said message units across said data path and for generating control signals responsive to said message units,
      a switch element, in electrical circuit with said controller element, for establishing, responsive to said control signals generated by said controller element, circuits between said plural extension lines and said trunk line.

16. A network server system according to claim 15 further including:
   an audio element for transferring voice messages to said trunk interface or said subscriber loop interface, and coupled to a memory for storing said voice messages.

17. A network server system according to claim 15 further including:
   a computer processor for executing computer software including a server telephony software application program.

18. A network server system according to claim 17 further including:
   a network interface for communicating telephony information from said network server system to a remote computer system.

19. A network server system according to claim 18 wherein said remote computer system includes a client telephony application computer program for sending said telephony information to said server telephony software application program.

20. A network server system according to claim 18 wherein said remote computer system includes a client telephony application computer program for receiving said telephony information from said server telephony software application program.

21. A network server system according to claim 20 wherein said telephony information is CSTA (Computer Supported Telephony Application) compliant.

* * * * *